V. W. BLANCHARD.
Hydrocarbon Furnace for the Production of Steam,
Reduction of Ores, &c.

No. 236,208. Patented Jan. 4. 1881.

Witnesses:
P. C. Dietrich.
Jno. A. Stockman.

Inventor
Virgil W. Blanchard
Per C. H. Watson & Co. Attorneys.

V. W. BLANCHARD.
Hydrocarbon Furnace for the Production of Steam, Reduction of Ores, &c.

No. 236,208. Patented Jan. 4, 1881.

Witnesses:
P. C. Dietrich
Jno. A. Stockman

Inventor
Virgil W. Blanchard
Per C. A. Watson & Co. Attorneys.

V. W. BLANCHARD.
Hydrocarbon Furnace for the Production of Steam, Reduction of Ores, &c.

No. 236,208. Patented Jan. 4, 1881.

V. W. BLANCHARD.
Hydrocarbon Furnace for the Production of Steam, Reduction of Ores, &c.

No. 236,208.

4 Sheets—Sheet 4.

Patented Jan. 4, 1881.

Witnesses:
P. C. Dieterich.
Jno. A. Stockman.

Inventor
Virgil W. Blanchard
per C. H. Watson & Co. Attorneys.

N. PETERS, PHOTO-LITHOGRAPHER, WASHINGTON, D. C.

UNITED STATES PATENT OFFICE.

VIRGIL W. BLANCHARD, OF WEYBRIDGE, VERMONT.

HYDROCARBON-FURNACE FOR THE PRODUCTION OF STEAM, REDUCTION OF ORES, &c.

SPECIFICATION forming part of Letters Patent No. 236,208, dated January 4, 1881.

Application filed July 24, 1879.

*To all whom it may concern:*

Be it known that I, VIRGIL W. BLANCHARD, of Weybridge, in the county of Addison and State of Vermont, have invented certain new and useful Improvements in Hydrocarbon-Furnaces for the Production of Steam, Reduction of Ores, &c.; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

The nature of my invention relates to a furnace for the production of steam, reduction of ores, &c., as will be hereinafter more fully set forth, and pointed out in the claims.

Figure 1:
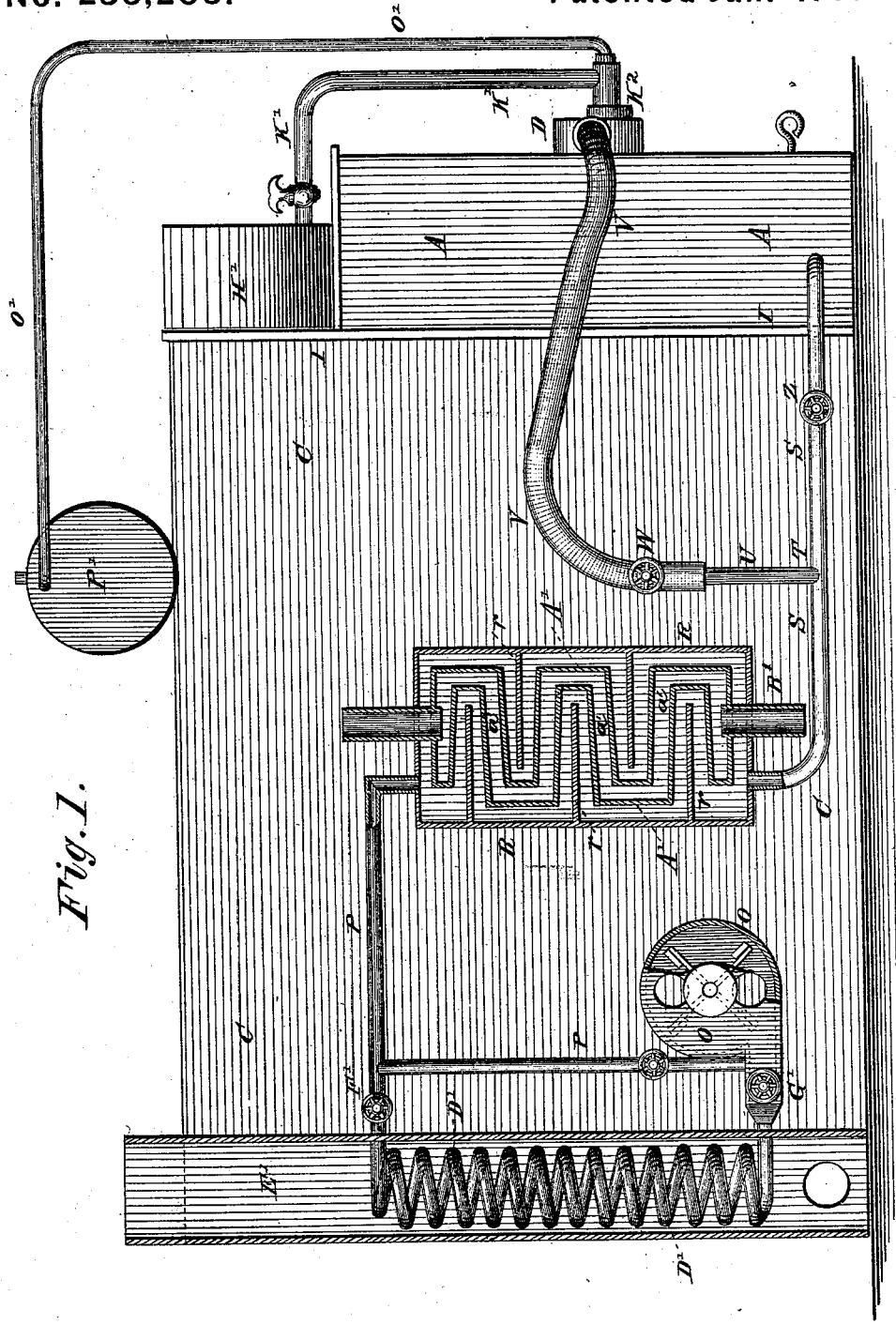
Figure 2:
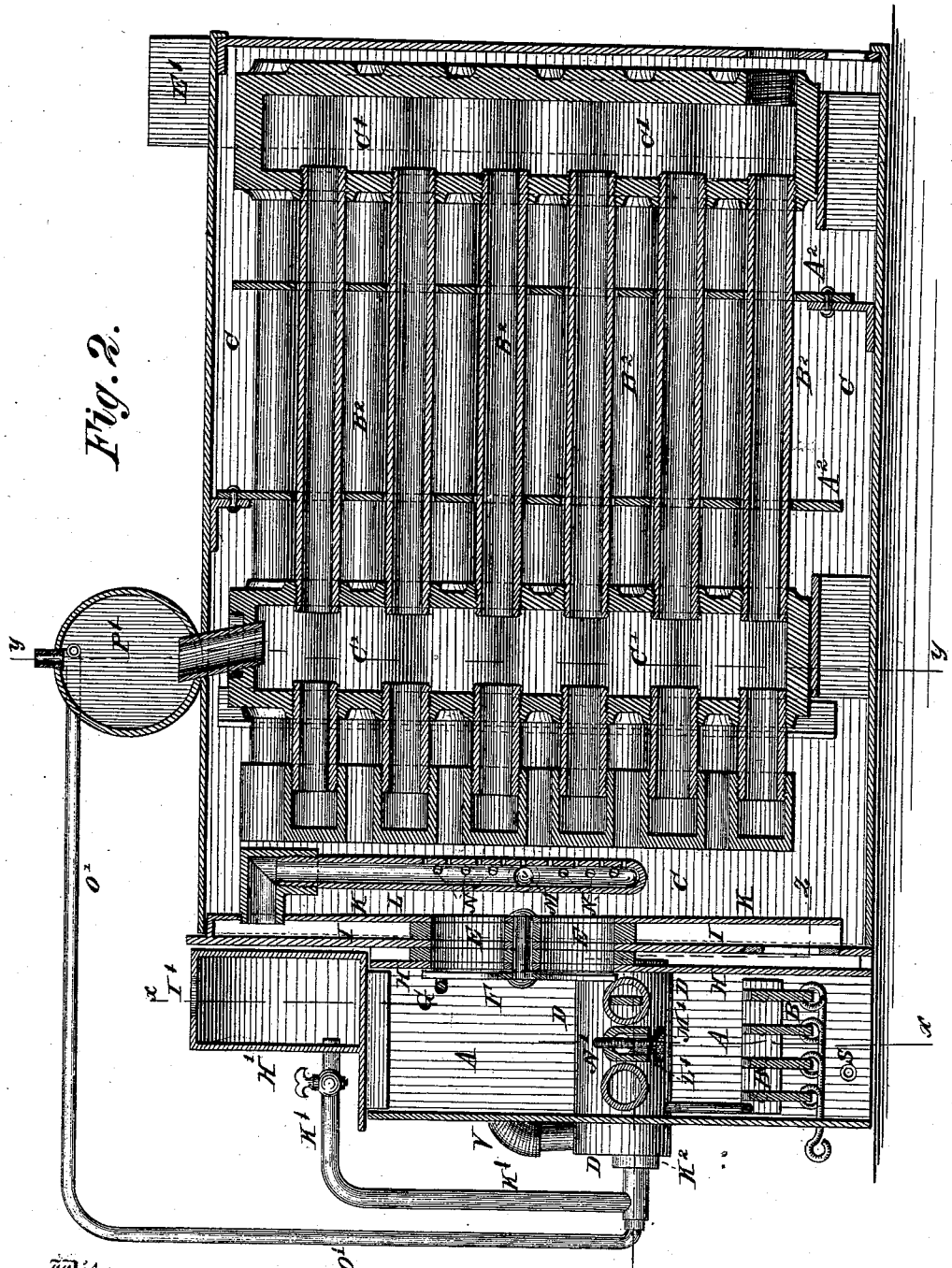
Figure 5:
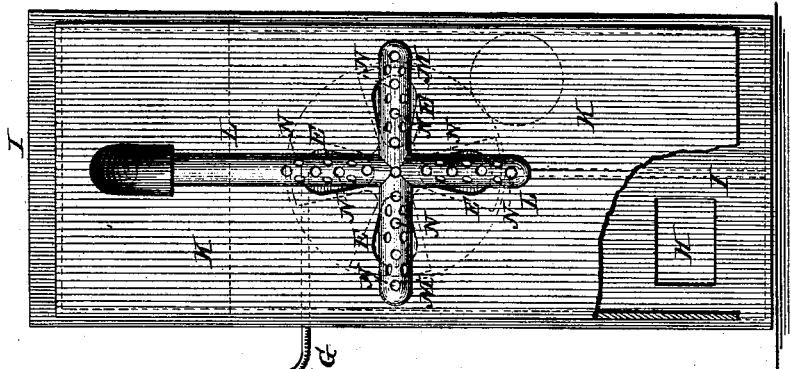
Figure 4:
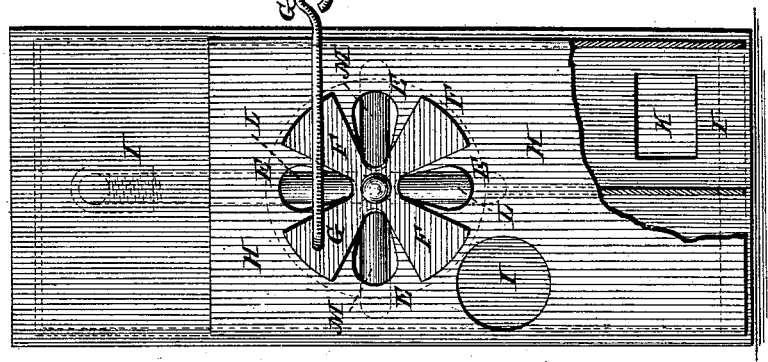
Figure 3:
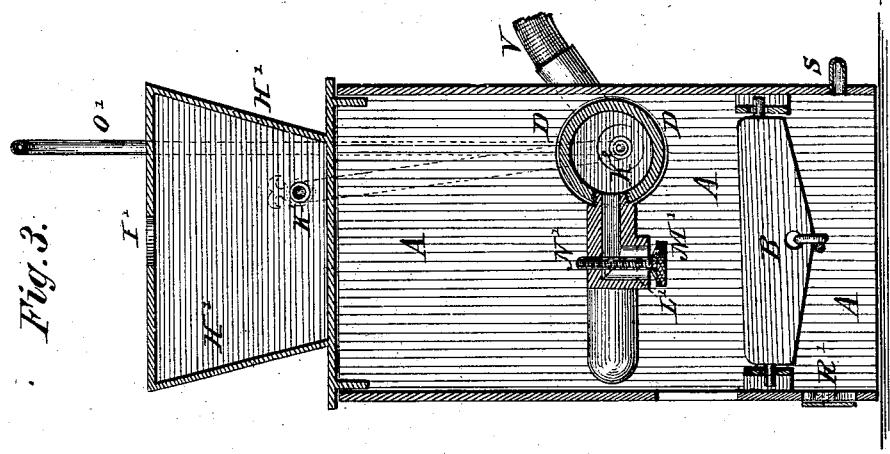
Figure 6:
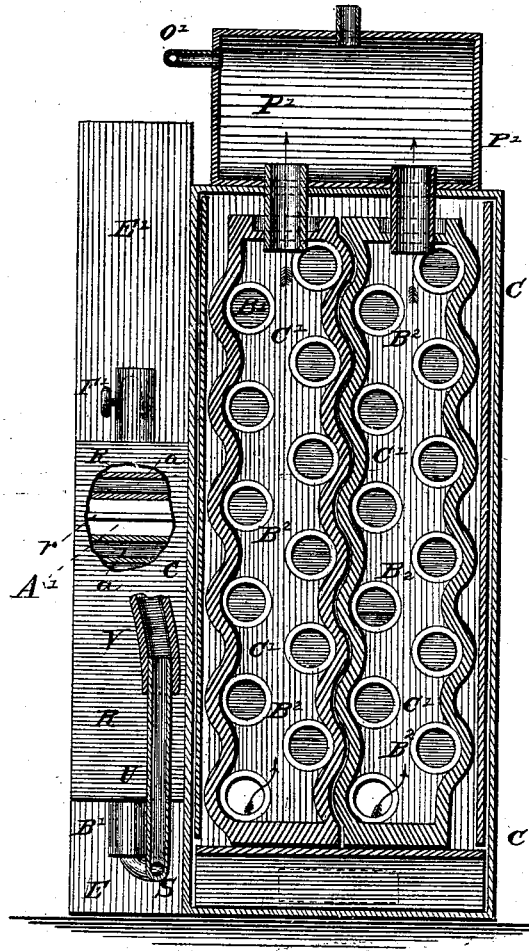
Figure 7:
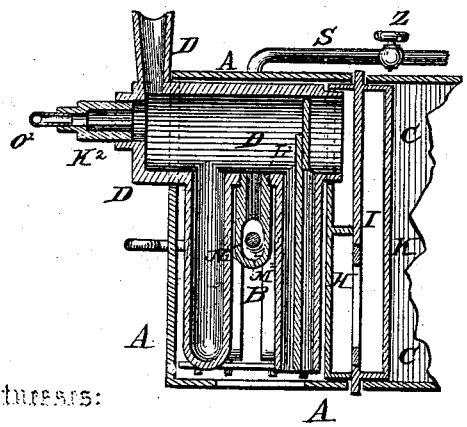

In the drawings, Figure 1 represents a side elevation of the improved furnace, with portions broken away in order to show the arrangement of the air-heaters and condenser. Fig. 2 represents a longitudinal vertical section of the furnace. Fig. 3 represents a transverse vertical section on the line $x\ x$ of Fig. 2. Fig. 4 represents an elevation of the rear wall of the fire-chamber, with a portion broken away, showing the flues between the fire-chamber and combustion-chamber. Fig. 5 represents an elevation of the front wall of the combustion-chamber and perforated pipe leading into said combustion-chamber. Fig. 6 represents a transverse vertical section on the line $y\ y$ of Fig. 2; and Fig. 7 is a section on the line $z\ z$, Fig. 2.

Similar letters of reference indicate corresponding parts.

The letter A indicates the fire-box of the furnace; B, the grate of the same, and C the combustion-chamber.

The letter D represents a movable tuyere or air-heater, located at one side of the fire-box, the construction of which will be more particularly hereinafter set forth.

The letters E E E E indicate a series of openings or apertures connecting the fire-chamber with the combustion-chamber, and F a damper pivoted to the rear wall of the fire-chamber, by means of which said apertures may be wholly or partially closed, the damper being actuated by a rod, G, extending through the side wall of the fire-box. The fire-chamber is separated from the combustion-chamber by means of a partition composed of the plates H I K, the plate H forming the rear wall of the fire-chamber, and K the front wall of the combustion-chamber.

The letter L indicates a descending vertical pipe behind the plates I K, extending from the space between said plates downward into the combustion-chamber. It will be observed that the lower portion of the vertical descending pipe passes directly before the upper and lower apertures in the partition between the fire-chamber and combustion-chamber, at a short distance behind the same.

The letter M represents two lateral branches of the pipe L, passing directly behind and at a short distance from the lateral apertures in the partition. The pipe L and its branches M are perforated, as indicated by the letter N, for the purpose hereinafter explained.

It will be observed that there is a channel of communication through the movable tuyere or air-heater D, located in the fire-chamber A, and the spaces in the partition-wall formed by the plates H I K and the vertical descending pipe L, so that the air, steam, or any gaseous element or elements that are forced into the outer extremity of the movable air-heater would pass directly through the fire-box while in said air-heater, and entering the spaces in the partition-wall between the plate forming one wall of the fire-box and the intermediate plating of said partition, and from thence around the intermediate plate of said partition-wall into the space between the said intermediate plate and the plate forming the front wall of the combustion-chamber C, and from thence down the vertical descending pipe, and would pass directly out of the perforation in said descending vertical pipe and its branches, that occupy a position in the combustion-chamber directly behind the apertures E E E E, opening from the fire-chamber into the combustion-chamber. It will thus be clearly seen that any gaseous element or elements that are forced into the outer extremity of the air-heater in their passage through the fire-box in said air-heater, and through the partition-wall H I K, between the fire-box and combustion-chamber, and thence out of the perforations in the descending vertical tube and its branches in the combustion-chamber, would become properly mixed and mingled with the gases of combustion passing through the apertures E E E E in the partition-wall between the fire-chamber and combustion-chamber.

It will be evident that by means of the circular damper within the fire-box A the flow of the combustible gases from the fire-chamber to the combustion-chamber may be regulated at the will of the operator.

The letter O indicates a fan, and P a pipe leading therefrom to an air-heater, R, in which the exhaust-steam from an engine-cylinder is used to heat the current of air passing from the fan through said air-heater.

The letter S indicates a pipe leading from the air-heater R to the fire-chamber A of the furnace.

It will be observed that the pipe S branches off at the point T, the branch U leading, by means of an elastic tube, V, into the outer extremity of the movable tuyere or air-heater D in the fire-chamber.

The letters W Z indicate valves by means of which the flow of air or gaseous elements into the fire-chamber and into the movable tuyere or air-heater D may be regulated by the operator.

It will be readily understood that, by means of the fan O, air or gases may be forced through the pipe P, and from thence through the air-heater R, and from said air-heater, through the pipe S and its branches, to the fire-box A and the outer end of the movable tuyere or air-heater located in the fire-box.

The letter A' indicates a condenser composed of a series of tortuous passages, $a$, which are constructed of thin sheet metal which is a good conductor of heat, through which passages the exhaust-steam from an engine is compelled to pass. Now, it will be observed that the passage for the steam in the condenser A is adjacent to the passages formed in the air-heater R by the partial partitions $r$, the said condenser being located in said air-heater R.

As a single metal plate serves as a wall for both passages, it follows that if air or any gaseous element or elements the temperature of which is below that of the exhaust-steam passing through the condenser A' is forced by the fan O through the air-heater R in the manner already described, it will cause the condensation of the steam in the condenser, and at the same time the air or gas passing through the air-heater R will become heated previous to entering the fire-chamber A and the outer end of the air-heater D.

The plates forming the condenser are placed in inclined positions, as clearly shown in Fig. 1 of the drawings, so that the water of condensation of the exhaust-steam will readily follow the passage between the walls of the condenser and the heater R, and will flow into a suitable trap or receptacle through a pipe, B', extending from the lower part of the condenser, preparatory to being returned to the boiler.

The letter D' represents an air-heater within the escape or exit flue E' of the furnace, through which air or gas supplied to the fan may be forced previous to the passage of the same through the air-heater R and condenser by means of suitable connecting-pipes and properly-arranged valves F' G'. This air-heater fulfills an important office when it is used in connection with the air-heater R and condenser, in which case it serves to utilize a portion of the heat that would otherwise escape from the exit-flue E', and return it to the fire-chamber and combustion-chamber in the manner heretofore described, passing through the air-heater R. In such a case a much larger volume of air or gas would be required from the fan to condense the exhaust-steam to water in the condenser in the manner already described.

The letter H' indicates a vessel or receptacle with an opening, I', at its top. From the lower part of said vessel extends a pipe, K', the lower extremity of which is connected with the outer extremity of the heater D and terminates in the fire-chamber at a point, L'.

The letter M' indicates an adjustable conical disk secured to a screw-bolt, N', by means of which it may be advanced or retracted from the open extremity of the pipe K'. It will thus be apparent that the open extremity of the said pipe may be closed to a greater or less degree by actuating the screw-bolt N', and also that a current of steam or air under pressure passing through the pipe K' would be forced, deflected, or dispersed in the fire-chamber A in a lateral or horizontal direction by the disk M', and that the flow may be increased or diminished by actuating the screw-bolt.

The letter O' indicates a pipe entering the pipe K'. Said pipe O' connects with a steam-chest, P', so that a current of steam may be directed through the pipe K', and from thence discharged or deflected in a lateral or horizontal direction into the center of the fire-chamber, directly beneath the air-heater D.

It is evident that if a current of air or steam, or a mixture of the same, were passing from the boilers C' or from the fan O through the pipe V into the air-heater D, any liquid fuel that might be fed from the fuel-receptacle H' would be drawn by the force of the gaseous current in the pipe K' into the fire-chamber A, and be forcibly dispersed or scattered in a lateral or horizontal direction beneath the air-heater D, from the point L', at or near the center of said chamber.

Pulverized fuel may be introduced in the same apparatus that is used for liquid fuel by a simple modification of the tank and feed-pipe. The jet of air or steam passing from the boiler or fan through the apparatus will cause either pulverized coal or a liquid to be carried into the outer end of the air-heater, and discharged on the fire-box of the furnace.

It will be obvious that by dispersing the liquid or granulated fuel in a lateral or horizontal direction from a point at or near the center of the fire-chamber A, the primary-heater draft entering the fire-chamber below the grate-bars B will pass upward directly through the same, thus affording a means for intimately mixing the elements.

It will be further observed that the dispersion of the liquid, gaseous, or pulverized fuel takes place within the fire-chamber A beneath the air-heater D, as heretofore clearly set forth.

I would here remark that under some circumstances more than one jet of gaseous element or elements and one discharge-pipe may be necessary in the dispersion of fuel in the fire-chamber A.

In the practical application of my invention ordinary fuel, such as wood or coal, is introduced into the fire-chamber upon the grate-bars B and kindled. The damper R' is opened, so as to allow a natural draft under the grate-bars. At the same time the circular damper F in the fire-chamber is opened to its full extent. After a sufficient degree of steam-pressure is obtained in the boiler to give motion to the piston in the cylinder of the engine the damper R' is closed, and motion is communicated to the fan, which will supply a primary artificial draft, entering the fire-chamber through the pipe S, beneath the grate-bars B, and the artificial draft from the secondary heater that is discharged into the cumbustion-chamber through the perforations in the vertical descending pipe L. By means of the valve Z in the pipe the flow of the air into the fire-chamber beneath the grate-bars may be regulated. After combustion is established in the fire-chamber A, and the movable tuyere or air-heater D and the partition-plates H I K and the discharge-pipe L M, which collectively form a single passage constituting a continuous air-heater extending through the fire-chamber and into the combustion-chamber, have become sufficiently heated, the valve W in the pipe V should be opened, which will allow a free passage of the air supplied by the fan through the air-heater into the combustion-chamber.

It will be seen that the current of fresh heated gaseous elements that are supplied by the fan are discharged in jets into the current of combustible gases passing through the apertures in the partition-wall between the fire-chamber and combustion-chamber.

It will also be observed that by removing the damper F, pivoted to the rear wall of the fuel-chamber, to a greater or less degree the combustible gases passing from said chamber into the combustion-chamber may be compressed, so as to render the mixing with them of the fresh heated gases more perfect.

By causing a current of gaseous elements to flow through the partition-wall between the fuel-chamber and combustion-chamber, and also through the discharge-pipes within the combustion-chamber, said pipes and partition-wall are prevented from injury by the intense heat present in the combustion-chamber. After combustion in the chamber has commenced the gases will follow the channel formed by the vertical plates $A^2$, thus extending their travel for a long distance around the pipes forming part of the steam-boiler. By this means the heat may be utilized to the most advantage. After leaving the boiler-tubes $B^2$ the gases of combustion pass into the escape-flue, in which is located the air-heater, through which the air or gases from the fan may be compelled to pass before they enter the fire-chamber and air-heater occupying said fire-chamber.

In the reduction of ores and minerals, and in all cases except the production of steam, the gaseous elements from the fan should be compelled to pass directly through the air-heater in the escape-flue, and from thence directly to the fire or fuel chamber A. In the production of steam the gaseous elements from the fan may be first forced through the air-heater in the escape-flue before they enter the condenser and air-heater D, if desired.

In the reduction of ores and minerals, a suitable receptacle, formed of fire-brick, will occupy the position now occupied by the boiler C', this fire-brick crucible being directly exposed to the intense heat. After the combustion of the fuel is well established, in the manner heretofore described, liquid, gaseous, or pulverized fuel may be forcibly conveyed into and consumed in the fire-chamber, in the manner and by the means heretofore described. By this means coal-dust, sawdust, and tar, as well as pulverized peat, may be conveniently burned; also petroleum and its products may be introduced and burned in a similar manner.

Having thus fully described my invention, what I claim as new, and desire to secure by Letters Patent, is—

1. In a furnace, the air-heater composed of a movable tuyere, D, partition-plates H I K, and perforated discharge-pipes L M, as and for the purpose herein set forth.

2. The perforated discharge-pipe within the combustion-chamber, in combination with the walls or plate provided with the apertures leading from the fire-chamber to the combustion-chamber, as and for the purpose herein set forth.

3. In a furnace, the combination of the air-heater R, by which the air is heated by the exhaust-steam, and the air-heater D' and combustion-chamber within the furnace, substantially as and for the purpose set forth.

4. The combination of the fire-chamber A, combustion-chamber C, air-heater D, and pipe L with plates H I K, as and for the purpose herein set forth.

5. The combination of the fire-chamber A, combustion-chamber C, air-heater D', fan O, and connecting-pipes with pipe L, for dispersing fuel, substantially as and for the purpose herein set forth.

6. The combination of the fire-chamber A, air-heater D, escape-flue E', air-heater D', fan O, and connecting-pipes, and a device, L, for dispersing fuel, as and for the purpose herein set forth.

7. The combination of the fire-chamber A, combustion-chamber C, air-heater D, fuel-receptacle H', and conducting-pipe K', substantially as and for the purpose herein set forth.

8. The combination of the fire-chamber A, pipe $K^2$, adjustable disk M', combustion-chamber C, and division-plates H I K, substantially as and for the purpose herein set forth.

In testimony that I claim the foregoing as my own I have hereto affixed my signature in presence of two witnesses.

VIRGIL W. BLANCHARD.

Witnesses:
    THEODORE RAWCLIFFE,
    HENRY P. SISSON.